Jan. 15, 1929.  O. TJELDE  1,699,035
TRESTLE
Filed May 16, 1927
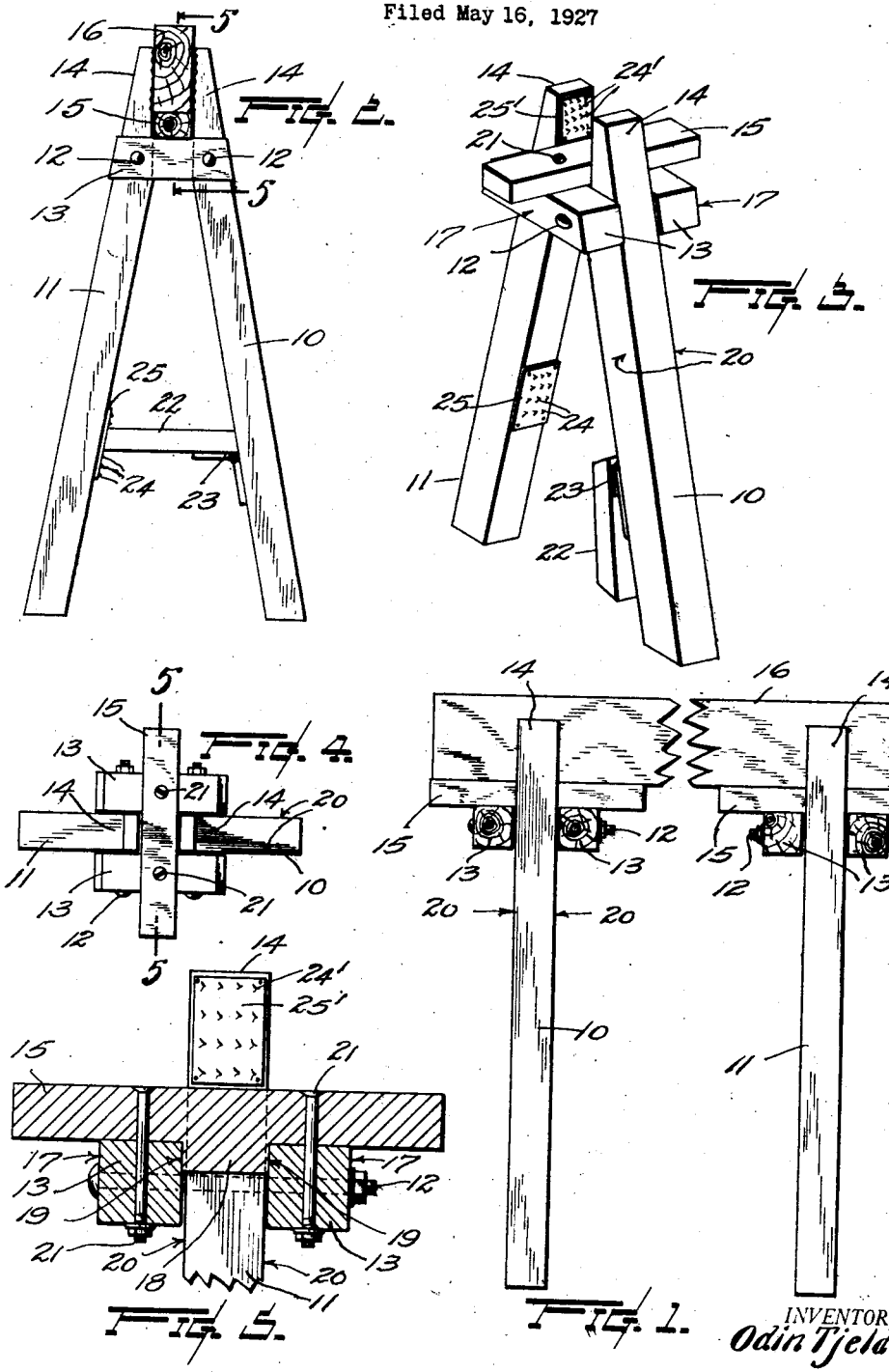
INVENTOR:
Odin Tjelde
BY
ATTORNEY.

Patented Jan. 15, 1929.

1,699,035

UNITED STATES PATENT OFFICE.

ODIN TJELDE, OF SEATTLE, WASHINGTON.

TRESTLE.

Application filed May 16, 1927. Serial No. 191,658.

This invention relates to collapsible supporting devices for carpenters' trestles, scaffolds, etc., and has for its object the provision of a simple, strong and durable construction of this character which is quickly collapsed into a small space and readily extended into operative condition to provide a rigid trestle structure.

With the foregoing and other objects in view, the invention consists in the novel construction, adaptation, arrangement and combination of parts as will be hereinafter described and claimed.

In the accompanying drawing,—

Figure 1 is a side elevation of a trestle embodying supports constructed in accordance with the present invention; Fig. 2 is an end view of Fig. 1; Fig. 3 is a perspective view of a trestle support; Fig. 4 is a plan view of Fig. 3; and Fig. 5 is a vertical section, to an enlarged scale, on lines 5—5, of Figs. 2 and 4.

In said drawing, the reference numerals 10 and 11 indicate a pair of legs pivotally connected intermediate their lengths by bolts 12 to coupling members 13, one at each side. The portions 14 of the legs above the coupling members constitute jaw elements, or "clamping jaws" as hereinafter termed.

15 represents a seat member disposed at right angles to said coupling members 13 upon which it is supported and serves as the seat for a scantling 16. Said seat is of a length to have its ends extend beyond the outside surfaces 17 of the respective coupling members; and is formed or provided with a depending rectangular block portion 18 extending into the space between the coupling members 13.

The block portion of the seat member 15 is of a length, desirable, slightly greater than the thickness of the legs, that is, than the distance between the side surfaces 20 thereof, the block (see Fig. 5) keeping the coupling members at a definite distance apart.

The coupling members are, by means of the coupling bolts 12, held firmly against the extremities 19 of the block 18; said bolts acting supplementary to bolts 21, which are provided to secure the seat to the coupling members 13, affording a rigid frame structure in which the legs are freely movable into and from their clamping relation with the scantling 16.

22 represents a bar provided between the legs, said bar being connected by a hinge 23 to the leg 10 and is adapted to be swung from its Fig. 3 position into that in which it is shown in Fig. 2 for retaining the lower portions of the legs in spread apart relation with a consequent clamping movement of the leg jaws 14 with respect to the scantling 16.

To obviate accidental dislodgement of the free end of the spreader 22 with respect to the leg 11, the latter is provided with engageable means which, as shown, consists of a plurality of barbs or protuberances 24 struck out from a metal plate 25 which is rigidly secured to the leg 11.

The opposing faces of the jaws 14 are also advantageously equipped with plates 25' having barbs 24' to engage the scantling 16 to prevent accidental displacement of the latter with respect to a support.

In practice, two supports, such as shown in Fig. 3, are usually employed for holding a scantling at an elevated position whereat artisans may work, or for supporting a platform, etc.

Among the advantages of my invention, are: first, a collapsible support which is of light weight and strong construction; second, convenience in handling and transporting because of its being foldable into a small space; and, third, a support which will furnish a large seating area for a scantling, such seating area being extended beyond both sides of the leg members, and acting mutually with a supported scantling to obviate wobbling of the supports and thus ensure a firm, rigid trestle structure upon which an artisan can perform his work in safety.

What I claim, is,—

A scantling supporter, comprising in combination, a frame consisting of a seat member provided intermediate its length with a depending block portion, and a pair of coupling members disposed in right angular relation with respect to the seat member and held in spaced apart relation by means of said depending block portion of the seat member, coupling bolts securing the coupling members with each other, bolts rigidly securing the seat member to the respective coupling members, a pair of leg members extending between the coupling members at opposite sides of the seat member and pivotally connected intermediate their lengths to the frame by means of said coupling bolts.

Signed at Seattle, Washington, this 18th day of April, 1927.

ODIN TJELDE.